(12) United States Patent
Patel et al.

(10) Patent No.: US 10,162,543 B1
(45) Date of Patent: Dec. 25, 2018

(54) SYSTEM AND METHOD FOR POWER MODE SELECTION IN A COMPUTING DEVICE

(71) Applicant: QUALCOMM Incorporated, San Diego, CA (US)

(72) Inventors: Dhaval Patel, San Diego, CA (US); Dhamim Packer Ali, San Diego, CA (US); Venkata Vara Prasad Gorantla, Hyderabad (IN); Anushka Mihir Nabar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/843,337

(22) Filed: Dec. 15, 2017

(51) Int. Cl.
| | |
|---|---|
| *G06F 21/00* | (2013.01) |
| *G06F 3/06* | (2006.01) |
| *G06F 1/32* | (2006.01) |
| *G06F 21/57* | (2013.01) |
| *G06F 21/78* | (2013.01) |
| *G06F 21/79* | (2013.01) |

(52) U.S. Cl.
CPC .......... *G06F 3/0625* (2013.01); *G06F 1/3296* (2013.01); *G06F 3/0623* (2013.01); *G06F 3/0634* (2013.01); *G06F 3/0683* (2013.01); *G06F 21/57* (2013.01); *G06F 21/572* (2013.01); *G06F 21/78* (2013.01); *G06F 21/79* (2013.01)

(58) Field of Classification Search
CPC ...... G06F 21/57; G06F 21/572; G06F 21/575; G06F 21/577; G06F 21/60; G06F 21/602; G06F 21/70; G06F 21/71; G06F 21/78; G06F 21/79
See application file for complete search history.

(56) References Cited

U.S. PATENT DOCUMENTS

| | | | | |
|---|---|---|---|---|
| 2007/0094486 | A1* | 4/2007 | Moore | G06F 9/4401 713/1 |
| 2009/0100516 | A1* | 4/2009 | Ray | G06F 9/4418 726/19 |
| 2012/0324251 | A1* | 12/2012 | Bolanowski | G06F 1/3203 713/300 |

* cited by examiner

*Primary Examiner* — Edward Zee
(74) *Attorney, Agent, or Firm* — Loza & Loza, LLP/ Qualcomm

(57) ABSTRACT

A system and a method for power mode selection in a portable computing device is provided herein. The system and method may comprise operations for operating the portable computing device in a normal mode. The normal mode may utilize a plurality of memory banks within a volatile memory, such as a random access memory ("RAM"), where the memory banks are powered-up and operable to store data. The system and method may further identify a memory segment within the plurality of memory banks, store the memory segment as a stored memory segment (where the stored memory segment is operable to restore the memory segment), and power down the powered-up memory bank associated with the memory segment. Further aspects are described herein.

30 Claims, 9 Drawing Sheets

SYSTEM AND METHOD FOR POWER MODE SELECTION IN A COMPUTING DEVICE

TECHNICAL FIELD

This disclosure relates generally to the field of power mode selection, and, in particular, to changing power modes in a portable computing device.

BACKGROUND

Many portable computing devices include complex system-on-chips ("SoCs"), many of which contain various logical and functional blocks related to the use and operation of the portable computing device. SoCs may be embedded in portable computing devices that many users interact with daily (e.g., a smartphone, a tablet, a laptop, etc.). However, as the world becomes more connected the definition of the portable computing device is growing to include so-called "smart" devices, which may include thermostats, smoke detectors, refrigerators, etc. Many refer to this change as the development of the "Internet of things," often abbreviated as "IoT." For use cases where the SoC is embedded in an IoT device, the SoC may need to reduce dc power consumption when not in use.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a system and method for power mode selection for portable computing devices. Accordingly, disclosed herein is a method for power mode selection in a portable computing device, the method including: operating the portable computing device in a normal mode, the normal mode utilizing a plurality of memory banks within a volatile memory, the plurality of memory banks being powered-up and operable to store data; identifying at least one or more memory segments within the plurality of memory banks; storing a first of the at least one or more memory segments as a stored memory segment in the volatile memory, the stored memory segment operable to restore at least a portion of the at least one or more memory segments; and powering down a portion of the plurality of memory banks associated with the at least one or more memory segments to transition the portable computing device to a hibernation mode, a cold boot mode or a shutdown mode.

In one example, the volatile memory is a random access memory (RAM). In one example, the method further includes storing a second of the at least one or more memory segments within a storage memory, the storage memory being non-volatile. In one example, the method further includes compressing the stored memory segment; and encrypting the stored memory segment, and may further include determining whether to switch to a hibernation mode or to a cold boot mode. In one example, the determining whether to switch to a hibernation mode or a cold boot mode is based on one or more of the following factors: time duration between wakeup intervals, hibernate state current, hibernate boot time, hibernate boot current, cold boot time, and cold boot current.

In one example, the method further includes powering down additional subsystems not associated with the stored memory segment within the portable computing device; receiving a wake up event, powering up the portion of the plurality of memory banks associated with the at least one or more memory segments; restoring the first of the at least one or more memory segments based on the stored memory segment; and storing the first of the at least one or more memory segments in the powered-up portion of the plurality of memory banks. In one example, the restoring the first of the at least one or more memory segments includes: decompressing the stored memory segment; and decrypting the stored memory segment.

In one aspect, disclosed herein is a system for power mode selection in a portable computing device, the system including: means for operating the portable computing device in a normal mode, the normal mode utilizing a plurality of memory banks within a volatile memory, the plurality of memory banks being powered-up and operable to store data; means for identifying at least one or more memory segments within the plurality of memory banks; means for storing a first of the at least one or more memory segments as a stored memory segment in the volatile memory, the stored memory segment operable to restore at least a portion of the at least one or more memory segments; and means for powering down a portion of the plurality of memory banks associated with the at least one or more memory segments to transition the portable computing device to a hibernation mode, a cold boot mode or a shutdown mode.

In one example, the volatile memory is a random access memory (RAM). In one example, the system further includes means for storing a second of the at least one or more memory segments within a storage memory, the storage memory being non-volatile; means for compressing the stored memory segment; means for encrypting the stored memory segment; and means for determining whether to switch to a hibernation mode or a cold boot mode. In one example, one or more of the following factors is used by the means for determining whether to switch to a hibernation mode or a cold boot mode: time duration between wakeup intervals, hibernate state current, hibernate boot time, hibernate boot current, cold boot time, and cold boot current.

In one example, the system further includes means for powering down additional subsystems not associated with the stored memory segment within the portable computing device; means for receiving a wake up event; means for powering up the portion of the plurality of memory banks associated with the at least one or more memory segments; means for restoring the first of the at least one or more memory segments based on the stored memory segment; and means for storing the first of the at least one or more memory segments in the powered-up portion of the plurality of memory banks. In one example, the means for restoring the first of the at least one or more memory segments includes means for decompressing the stored memory segment; and means for decrypting the stored memory segment.

In one aspect, disclosed herein is a portable computing device including a system-on-chip ("SoC"); a random access memory ("RAM") coupled to the system-on-chip; a processor coupled to the RAM, the processor configured to perform operations including: operating the portable computing device in a normal mode, the normal mode utilizing a plurality of memory banks within the RAM, the plurality of memory banks being powered-up and operable to store data; identifying at least one or more memory segments within the plurality of memory banks; storing a first of the at least one or more memory segments as a stored memory segment in the RAM, the stored memory segment operable to restore at least a portion of the at least one or more memory segments; and powering down a portion of the plurality of memory banks associated with the at least one or more memory segments to transition the portable computing device to a hibernation mode, a cold boot mode or a shutdown mode.

In one example, the processor is further configured to perform operations including: compressing the stored memory segment; and encrypting the stored memory segment. In one example, the processor is further configured to perform operations including determining whether to switch to a hibernation mode or a cold boot mode, wherein the processor determines whether to switch to a hibernation mode or a cold boot mode based on one or more of the following factors: time duration between wakeup intervals, hibernate state current, hibernate boot time, hibernate boot current, cold boot time, and cold boot current.

In one example, the processor is further configured to perform operations including: receiving a wake up event; powering up the portion of the plurality of memory banks associated with the at least one or more memory segments; restoring the first of the at least one or more memory segments based on the stored memory segment; and storing the first of the at least one or more memory segments in the powered-up portion of the plurality of memory banks. In one example, the portable computing device is an internet-of-things ("IoT") device, which may comprise any one of: a utility meter, a smoke detector, a thermostat, a weather station, a security system, a refrigerator, a washing machine, a clothes dryer, a television, a gaming console, a gaming console peripheral, a personal assistant, an entertainment system, or combination thereof.

In one aspect, disclosed herein is a non-transitory processor-readable storage medium having stored thereon processor-executable instructions configured to cause a processor to perform operations for power mode selection in a portable computing device, the operations including: operating the portable computing device in a normal mode, the normal mode utilizing a plurality of memory banks within a volatile memory, the plurality of memory banks being powered-up and operable to store data; identifying at least one or more memory segments within the plurality of memory banks; storing a first of the at least one or more memory segments as a stored memory segment in the volatile memory, the stored memory segment operable to restore at least a portion of the at least one or more memory segments; and powering down a portion of the plurality of memory banks associated with the at least one or more memory segments to transition the portable computing device to a hibernation mode, a cold boot mode or a shutdown mode.

In one example, the non-transitory processor-readable storage medium having stored thereon processor-executable instructions configured to cause a processor to perform operations relating to power mode selection in the portable computing device, the operations further including: compressing the saved memory segment; and encrypting the saved memory segment; receiving a wake up event; powering up the portion of the plurality of memory banks associated with the at least one or more memory segments; and restoring the first of the at least one or more memory segments based on the stored memory segment, wherein the restoring the first of the at least one or more memory segments includes decompressing the stored memory segment and decrypting the stored memory segment; and storing the first of the at least one or more memory segments in the powered-up portion of the plurality of memory banks.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
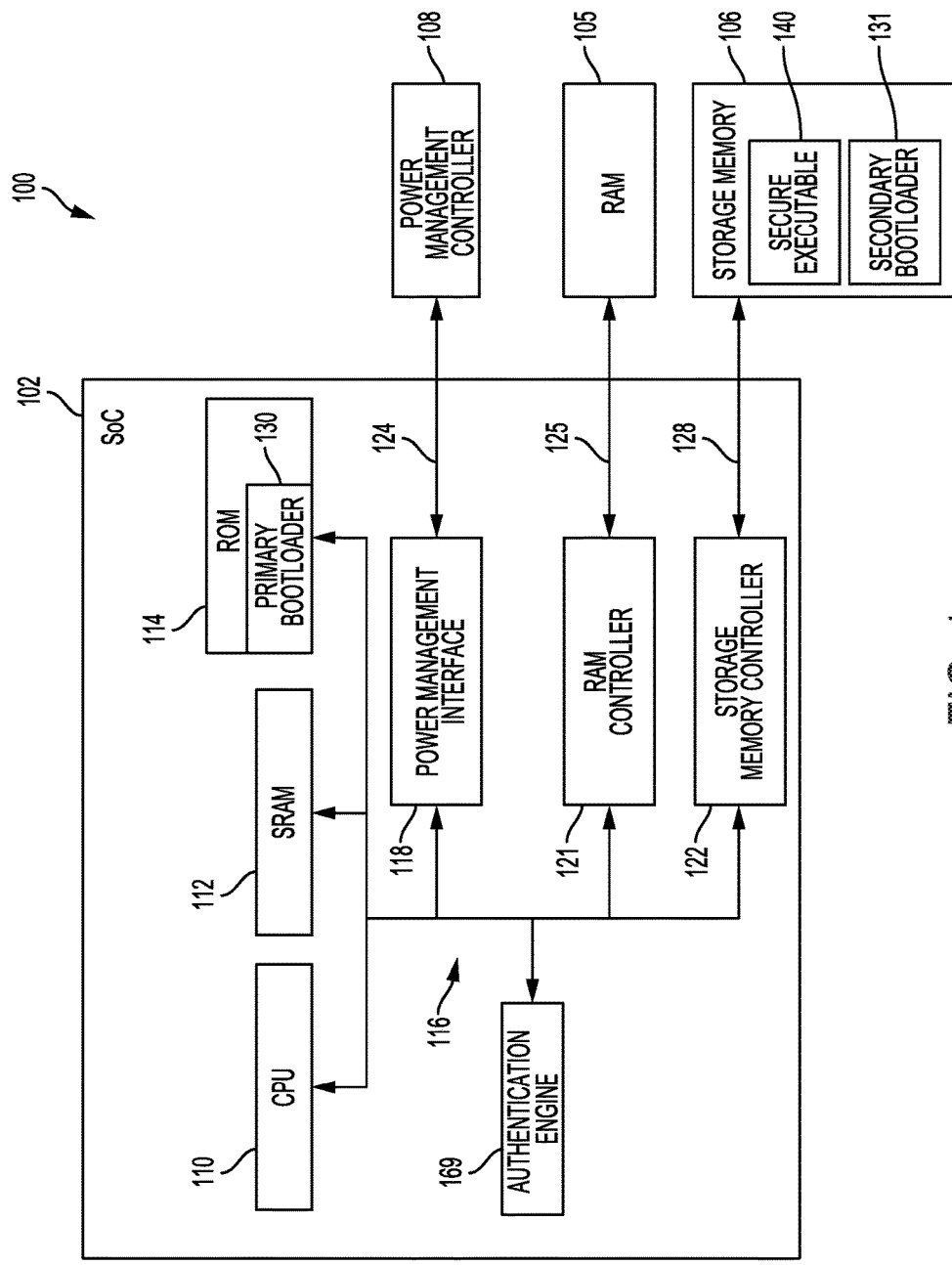
FIG. 1 illustrates an example block diagram of a system operable to boot, hibernate, and wake a portable computing device.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The word "exemplary" is used herein to mean "serving as an example, instance, or illustration." Any aspect described herein as "exemplary" is not necessarily to be construed as preferred or advantageous over other aspects. In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed. The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "portable computing device," "wireless device," "wireless telephone", "wireless communication device," and "wireless handset" are used interchangeably. With the advent of third generation ("3G"), fourth generation ("4G"), and fifth generation ("5G") wireless technologies, greater bandwidth availability has enabled more portable computing devices with a greater variety of wireless capabilities. Therefore, a portable computing device may include a cellular telephone, a pager, a PDA, a smartphone, a navigation device, an Internet of Things ("IoT") device, a wearable device, or a hand-held computer with a wireless connection or link.

In one aspect, portable computing devices include complex system-on-chips ("SoCs"). For example, an SoC embedded within an IoT thermostat, may need to reduce power when not in operation (e.g., while the user is sleeping) to conserve battery life. Some of these IoT devices may be battery-operated and operable to communicate via a wireless connection. For such battery-operated IoT devices, the need for low-power idle and/or sleep states is an important consideration. For example, the battery life expectancy for many of these IoT portable computing devices may be longer than ten years. Achieving such an extended battery life may be challenging without more efficient and effective solutions within SoCs, which power such IoT devices. However, the IoT device may not be able to fully power down, especially if the IoT device needs to wake to alert the user about a potential hazard (e.g., a smoke detector sounding an audible alarm to wake sleeping users).

In one aspect, the present disclosure discloses power-efficient solutions within SoCs to enable longer battery life without compromising the function of the portable computing device. And, in one aspect, the present disclosure may be applicable to various devices, whether it be a smartphone or a "smart" (IoT) smoke detector, for example. Furthermore, the SoC may need to have a low latency when waking from a low-power state in order to carry out the IoT device's intended function. The aspects disclosed herein provide many solutions to providing low latency and/or enabling longer battery life.

In one aspect, a system and/or a method for power mode selection in a portable computing device is provided herein. The system and method may include operations for operating the portable computing device in a normal mode. The normal mode may utilize a plurality of memory banks within a random access memory ("RAM"), wherein the memory banks are powered-up and operable to store data. The system and/or method may further identify a memory segment within the plurality of memory banks, store the memory segment as a stored memory segment (where the stored memory segment is operable to restore the memory segment), and power down the powered-up memory bank associated with the memory segment.

In one aspect the stored memory segment may be stored within the RAM, and the RAM may include at least one powered-up memory bank. In another aspect, the stored memory segment is stored within a storage memory, and the storage memory may be non-volatile. The system and/or method may further compress the saved memory segment and encrypt the saved memory segment. In one aspect, the system and/or method may power down additional subsystems within the portable computing device.

In another aspect, the system and method may power up additional subsystems within the portable computing device, restore the memory segment from the saved memory segment, and store the memory segment in a powered-up memory bank within the RAM. In another aspect, restoring the memory segment from the saved memory segment may include decompressing the saved memory segment and decrypting the saved memory segment.

In yet another aspect, the portable computing device may be an IoT device, which may include any one of: a utility meter, a smoke detector, a thermostat, a weather station, a security system, a refrigerator, a washing machine, a clothes dryer, a television, a gaming console, a gaming console peripheral, a personal assistant, an entertainment system, or combination thereof. In one aspect, the IoT device may be electronically coupled to a battery. One skilled in the art would understand that the example devices disclosed herein are only examples and are not meant to provide an exhaustive list nor to preclude other devices not mentioned herein.

FIG. 1 illustrates an example block diagram of a system 100 operable to boot, hibernate, and wake a portable computing device. An SoC 102 contains a number of subsystems and logical blocks that enable functionality within a portable computing device. A central processing unit ("CPU") 110 may be electronically coupled to various components within the SoC 102 via a bus 116. One of skill in the art will understand that the bus 116 could be a logical fabric, a physical fabric, a network on chip ("NoC"), or any number of equivalent communication channels. A static random access memory ("SRAM") 112 may be electronically coupled via the bus 116 to the various components within the SoC 102. SRAM 112 is a type of semiconductor memory that uses bistable latching circuitry and is typically used for CPU-related caching operations. A read-only memory ("ROM") 114 may be electronically coupled via the bus 116 to the various components within the SoC 102. The ROM 114 may contain data accessible by the CPU 110, including boot-related code and/or instructions. In one example, a primary bootloader 130 may reside within the ROM 114. The primary bootloader 130 may be utilized by the SoC 102 during boot operations to power up the portable computing device containing the SoC 102. When the portable computing device is in a power-off state, a "cold" boot may be required. During such a "cold" boot, a state of the volatile memory (e.g., random access memory, RAM 105) may be unknown and/or the volatile memory may contain unreliable data. Therefore, the primary bootloader 130 may be stored in the ROM 114, in which the primary bootloader 130 may be stored in a substantially unalterable state.

A secondary bootloader 131 may be stored in a storage memory 106 and may first be authenticated by the primary bootloader 130 prior to operation. There may be multiple secondary untrusted boot programs (not shown). These secondary untrusted boot programs may be copied from the storage memory 106 into the SRAM 112 or the RAM 105 to enable programmatic execution after successful authentication and/or decryption. Secondary untrusted boot programs may be authenticated and executed sequentially, concurrently, or combination thereof during the boot process.

An authentication engine 169 may be electronically coupled via the bus 116 to provide verification of data and/or instructions relating to the boot operations of the portable computing device. In one aspect, the authentication engine 169 may assist the primary bootloader 130 stored in the ROM 114 with the authentication of secondary untrusted bootloaders (not shown). In another example, in a series of sequential boot programs being utilized, the authentication engine 169 may assist the secondary bootloader 131 with the authentication of secondary untrusted boot programs (not shown).

A power management interface 118 may be connected via a bus 124 to a power management controller 108. Likewise, the power management interface 118 may be electronically coupled via the bus 118 to the various components within the SoC 102.

A RAM controller 121 may be electronically coupled via bus 125 to a RAM 105. Likewise, the RAM controller 121 may be electronically coupled via the bus 116 to the various components within the SoC 102. The RAM 105 may be used for operational storage of data and executable code while the SoC 102 is in operation.

A storage memory controller 122 may be electronically coupled via bus 128 to the storage memory 106. Likewise, the storage memory controller 122 may be electronically coupled via the bus 116 to the various components of the SoC 102. The storage memory 106 may be used for operational storage of data, or non-operational storage of executable code while the SoC 102 is in operation or powered down.

In one example, the storage memory 106 may contain a secure executable module 140. The secure executable module 140 may be utilized by the SoC 102 to carry out operations related to the function of the portable computing in which the SoC 102 is embedded. For example, the secure executable module 140 may include code and/or data configured to employ various sensors to detect the presence of smoke or fire. The secure executable module 140 may consume a plurality of memory banks (not shown) within the RAM 105; as such, the SoC 102 may need to rearrange, compress, and/or encrypt portions of the secure executable module 140 in order to enable a hibernation mode.

One of skill in the art will understand that the secure executable module 140 may take on any number of configurations to achieve a desired functionality in the IoT context. For example, the secure executable module 140 may be configured to monitor weather, manage climate control systems, detect hazardous events (e.g., fire), etc. One skilled in the art would understand that the examples of configurations disclosed herein are not meant to be limiting and that other configurations of the secure executable module 140 are readily apparent to one of skill in the art working to enable portable computing devices in the IoT context, and are within the scope and spirit of the present disclosure.

Figure 2A:
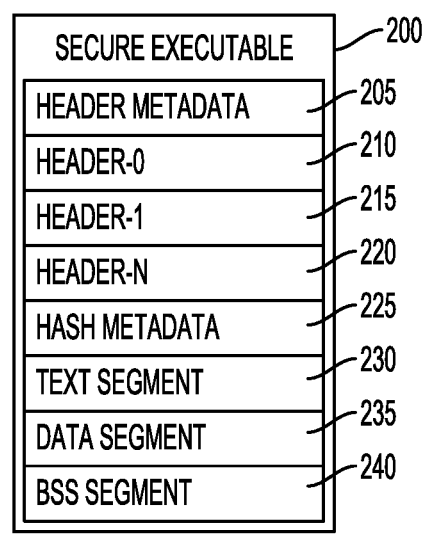
FIG. 2A illustrates an example block diagram of a secure executable module and its associated code and data.

FIG. 2A illustrates an example block diagram of a secure executable module 200 and its associated code and data. The secure executable module 200 may include a number of segments, each of which perform functions related to the operation of the SoC 102. The secure executable module 200 may include header metadata 205. In one example, the header metadata 205 relates to a plurality of headers 210, 215, 220, any of which may reference an executable segment of code or segment of data. The header metadata 205 may contain additional information about the headers 210, 215, 220 which may describe attributes or parameters about the data in the headers 210, 215, 220. For example, header-0, 210, header-1, 215, and header-N, 220, may indicate a RAM location where a particular segment may be executed and/or may indicate attributes of the segments (e.g. read-only, read-write, executable, etc.).

For example, the portable computing device may be a smart meter configured to monitor and report the electricity usage of a dwelling. One of skill in the art will understand that the quantity of headers 210, 215, 220 may depend on the needs of the portable computing device. As shown in FIG. 2A, the value of N as associated with header-N may be any integer.

Hash metadata 225 may be stored within the secure executable module 200. The hash metadata 225 may be used to verify the integrity of various portions of the secure executable module 200. For example, the hash metadata 225 may be the output of a SHA-256 algorithm. In the event of a hash mismatch, the secure executable module 200 may be considered untrusted and subsequently handled by security protocols within the SoC 102. For example, the secure executable module 200 or portions therein may be replaced by new versions that can be trusted. In one example, the authentication engine 169 may be employed for such security-related operations.

A text segment 230 may be stored within the secure executable module 200. In one example, the text segment 230 may be a code. For example, the text segment 230 may be plaintext code or a binary image depending on the context and use of the SoC 102 (and its associated portable computing device). In one example, the text segment 230 may include algorithms operable to utilize sensors to detect the presence of leaking water in a residence, thus alerting the homeowner of a potential flood. In another example, the text segment 230 may include algorithms related to communicating data over a wireless link to a remote server such that the user of the portable computing device may ascertain what observations the portable computing device has conducted. One skilled in the art would understand that the example algorithms disclosed herein are only examples and does not preclude other algorithms within the scope and spirit of the present disclosure.

A data segment 235 may be stored within the secure executable module 200. For example, the data segment 235 may contain plaintext or binary data related to the secure executable module 200. In one example, the data segment 235 may contain settings that enable the functionality of the SoC 102. For example, the SoC 102 may be embedded in a portable computing device configured to operate a climate control system in a dwelling. The portable computing device may have a display which outputs graphical images to the user in order to provide a pleasing user experience. For example, an image of a snowflake may be displayed when the user enables the cooling function of the climate control system. In the data segment 235, the image of the snowflake may be stored as binary data (e.g., a Joint Photographic Experts Group ("JPEG") formatted image, a portable network graphics ("PNG") formatted image, etc.). One skilled in the art would understand that the example functionalities disclosed herein are only examples and does not preclude other functionalities within the scope and spirit of the present disclosure.

A block started by symbol ("BSS") segment 240 may be stored within the secure executable module 200. In one example, the BSS segment 240 may contain data that enables the initialization of code and/or data. For example, some variables in code may be initialized to zero values. One of skill in the art may refer to such zero initialized data as "ZI" data or "zero init" data for short.

While the secure executable module 200 described in FIG. 2A is illustrative, one of skill in the art will understand that other formats and/or configurations of the secure executable module 200 may be developed that achieve functionalities similar to the functions described herein. And, that such other formats, configurations and/or functionalities, although not explicitly listed herein, may be within the scope and spirit of the present disclosure.

Figure 2B:
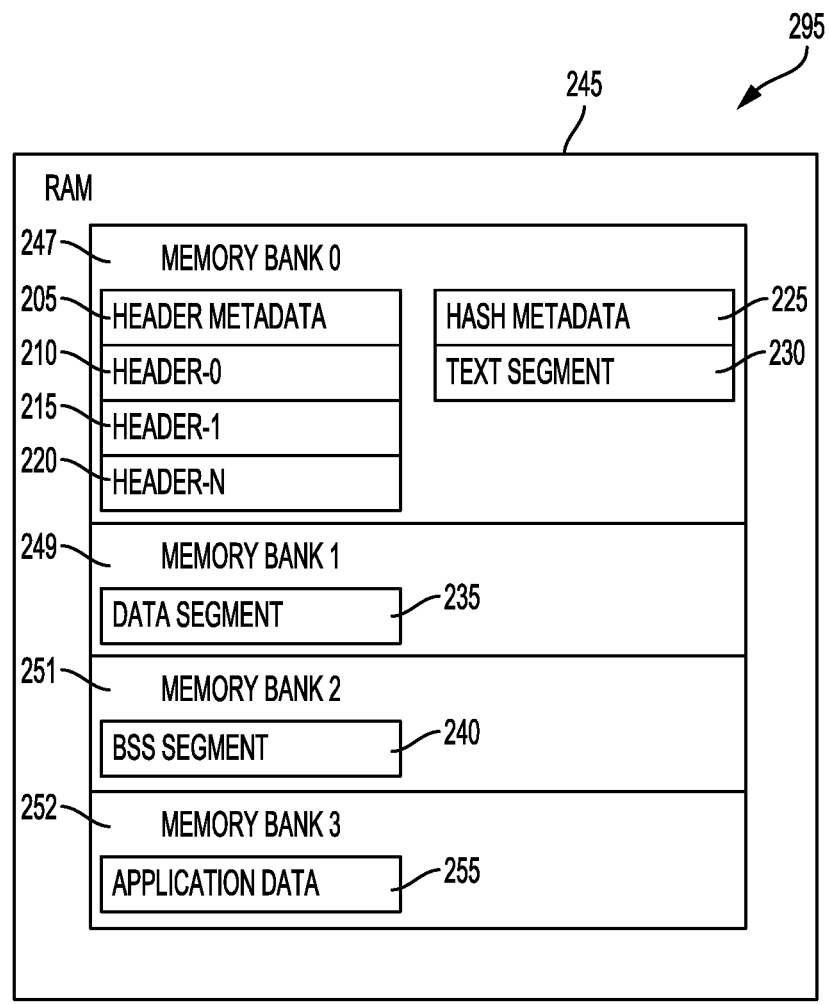
FIG. 2B illustrates a first example configuration of a random access memory (RAM) with a plurality of memory banks powered up.

FIG. 2B illustrates a first example configuration 295 of a random access memory (RAM) 245 with a plurality of memory banks 247, 249, 251, 252 powered up. The secure executable module 200 may be comprised of segments as described in FIG. 2A above. In one example, the configuration 295 shown in FIG. 2B corresponds to a normal mode. The configuration 295 shows an example of how segments of the secure executable module 200 may be populated across the memory banks 247, 249, 251, 252. In memory bank 247, several segments may be stored including: the header metadata 205, the header-0 210, the header-1 215, the header-N 220, the hash metadata 225, and the text segment 230. Any of the memory banks 247, 249, 251, 252 may be powered up or off depending on the state of the RAM 245. In the configuration 295, the memory banks 247, 249, 251, 252 are powered up and storing data and/or code.

In memory bank 249, the data segment 235 may be stored. The memory bank 249 may be powered up in this configuration 295. In one example, the data segment 235 may be uncompressed and decrypted, thus enabling operation of the SoC 102 in normal mode.

In memory bank 251, the BSS segment 240 may be stored. The memory bank 251 may be powered up in this configuration 295. The BSS segment 240 may contain initialization data (or "zero init" data) that is operable to initialize and enable portions of the data and/or code stored in the RAM 245.

In memory bank 252, application data 255 may be stored. Application data 255 is data and/or code that exists outside the secure executable module 200. For example, the SoC 102 may allow the operation of third-party applications to run on the portable computing device. In one example, such third-party applications may include applications that are developed after the deployment of the SoC 102 and enable further functionality of the portable computing device. In another example, the headers 210, 215, 225 may point to application data 255. In one example, application data 255 is not part of the secure executable module 200. In this case, application data will be lost upon hibernation mode entry and will need to be reloaded once hibernation mode exit is performed.

One of skill in the art will understand that the memory banks 247, 249, 251, 252 are illustrative and not limiting. In modern designs, there may be several memory banks beyond the four shown. However, one of skill in the art will understand that the four depicted memory banks 247, 249, 251, 252 provide at least one depiction of the segments of the secure executable module 200 and application data 255 being populated across different memory banks.

Figure 2C:
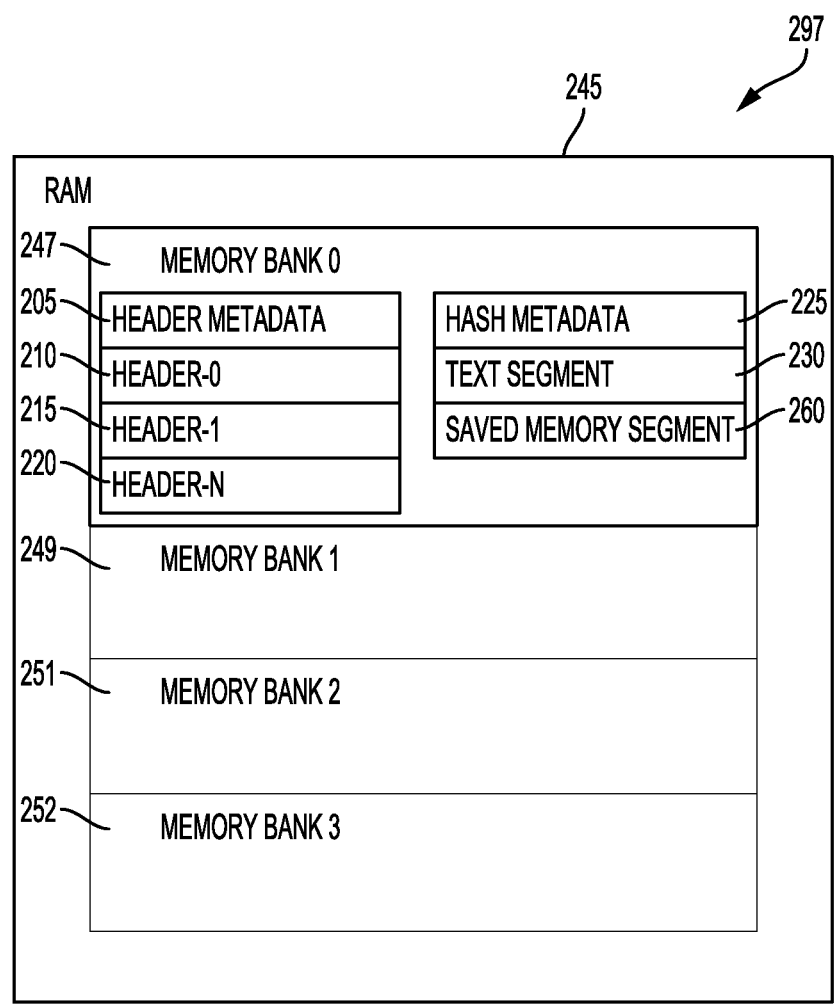
FIG. 2C illustrates a second example configuration of a random access memory (RAM) with a plurality of memory banks, some of which are powered down.

FIG. 2C illustrates a second example configuration 297 of a random access memory (RAM) 245 with a plurality of memory banks 247, 249, 251, 252. As shown in FIG. 2C, the configuration 297 includes some of the plurality of memory banks powered down (e.g., memory banks 249, 251, 252 are powered down). As such, the data stored therein may be lost or considered unreliable (due to an uncertain state of the memory cells within the RAM 245). To prevent the complete loss of data and/or state, a saved memory segment 260 may be utilized to store a compressed instance of the data previously stored in the powered-down memory banks 249, 251, 252. In one example, the saved memory segment 260 contains the data of the data segment 235, the BSS segment 240, the application data 255, or combination thereof. One of skill in the art will understand that some data may not be necessary to save and/or compress if such data could be readily retrieved or inferred from another location. The configuration 297 illustrates how some memory banks may be powered down whereas other memory banks may remain powered up (e.g., memory band 247 is powered up). In one example, the configuration 297 corresponds to the hibernation mode described herein.

Figure 2D:
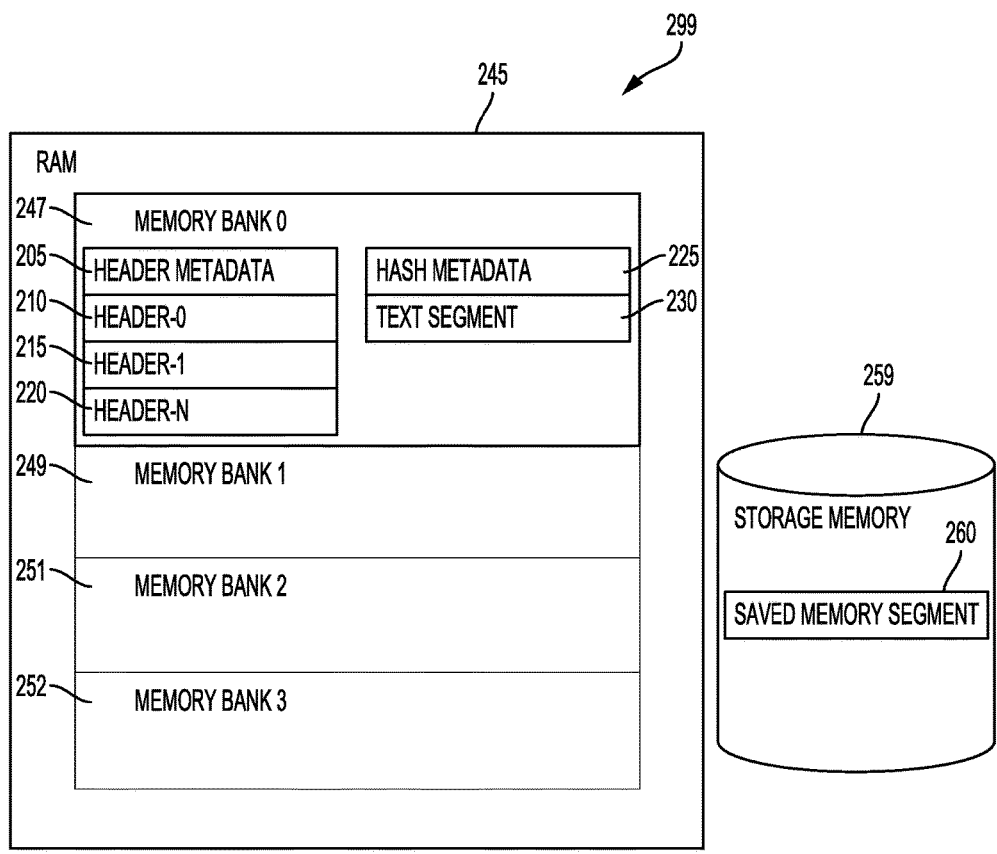
FIG. 2D illustrates a third example configuration of a random access memory (RAM) with a plurality of memory banks, wherein the RAM shares data with a storage memory.

FIG. 2D illustrates a third example configuration 299 of a random access memory (RAM) 245 with a plurality of memory banks 247, 249, 251, 252, wherein the RAM shares data with a storage memory 259. As shown in FIG. 2D, the storage memory 259 is electronically coupled to the RAM 245. The configuration 299 shows that some of the plurality of memory banks are powered down and others are powered up. Specifically, the memory banks 249, 251, 252 are powered down, and the memory bank 247 is powered up. Referring back to FIG. 2C, the saved memory segment 260 may be stored in the memory bank 247. In FIG. 2D, the saved memory segment 260 may be stored in the storage memory 259. The configuration 299 may correspond to the hibernation mode described herein.

One example benefit of storing the saved memory segment 260 in the storage memory 259 is the storage capacity of the storage memory 259 may be greater than that of the RAM 245, even with all memory banks powered up. Furthermore, the storage memory 259 may not require constant power to store data, since the storage memory 259 may be non-volatile. As such, the battery life of the portable computing device may be extended with the selective use of the storage memory 259.

In storing the saved memory segment 260 in the storage memory 259 latency may affect retrieval of the saved memory segment 260 from the storage memory 259. Typical flash storage devices may require retrieval of data by blocks which may not be as fast as random access provided through typical RAM components. Further, accessing the storage memory 259 may require further power consumption because the SoC 102 may need to power up the bus 116, the storage memory controller 122, and the bus 128, all of which connect the RAM 245 to the storage memory 259. In one example, the complexity of the power-up operations may require that the entire SoC 102 be powered up which may affect the extended battery life.

In one example, the configuration 297 may be used. In another example, the configuration 299 is used. In yet another example, both configurations 297, 299 may be used. In one example, a combination of the configurations 297, 299 may be employed where some portion of the saved memory segment 260 is stored in the RAM 245, and another portion of the saved memory segment 260 is stored in the storage memory 259. For example, application data 255 may be stored in storage memory 259 and retrieved as needed.

Figure 3:
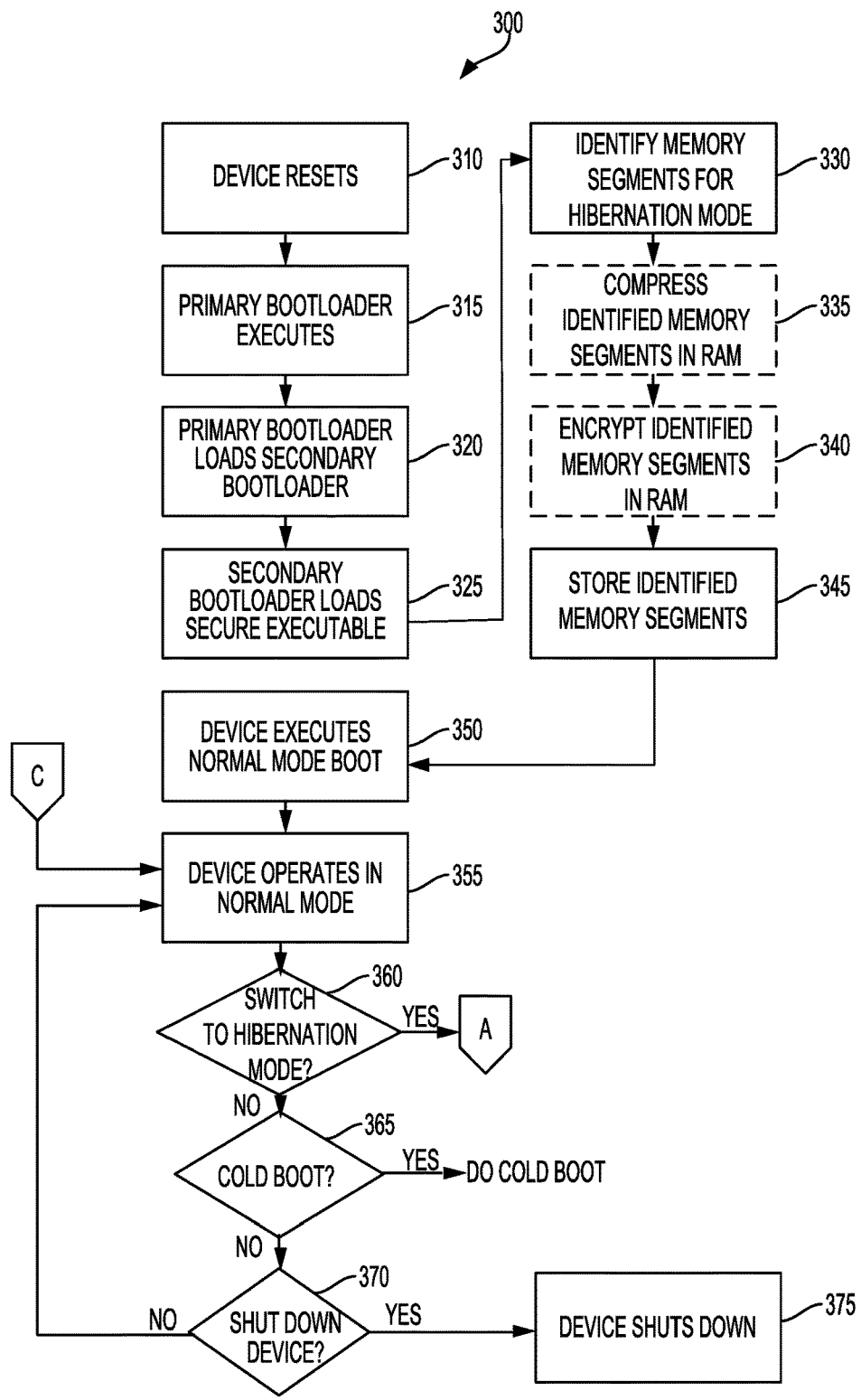
FIG. 3 illustrates an example flow diagram for booting and operating a portable computing device configured for hibernation mode.

FIG. 3 illustrates an example flow diagram 300 for booting and operating a portable computing device configured for hibernation mode. In block 310, the portable computing device resets. The device reset in block 310 may be a first-time boot of the portable computing device. Or the device reset may be a subsequent reset of the portable computing device after the portable computing device has been in operation for an amount of time i.e., "mission mode." In one example, the power management controller 108 may communicate via the bus 124 to the power management interface 118 in order to start the process at the block 310. For example, a signal or user event may trigger the power management controller 108 to communicate with the SoC 102.

In one example, in block 310, the SoC 102 initializes the subsystems contained therein. For example, initialization may be performed by a primary bootloader described herein. For example, the SoC 102 may utilize the RAM controller 121 to communicate across the bus 125 to the RAM 105 such that the RAM 105 may be cleared and initialized. Another example of initialization may include the SoC 102 communicating with the storage controller 122 to communicate across the bus 128 to the storage memory 106, which may include accessing the secure executable module 111 and secondary bootloader 131. Yet another example of initialization at the block 305 may include the SoC 102 accessing the ROM 114 via the bus 116 to access the primary bootloader 130 contained within the ROM 114.

Once subsystems are initialized at block 310, in block 315, the SoC 102 executes the primary bootloader 130 directly from ROM 114. In one example, the SoC 102, in conjunction with the CPU 110, executes the primary bootloader 130. In one example, the primary bootloader 130 does not require authentication since it is stored in immutable memory, e.g., ROM 114. In one example, the primary bootloader 130 may even be compressed to save memory within the ROM 114; as such, a decompression algorithm within the SoC 102 may need to operate to decompress the primary bootloader 130. The primary bootloader 130 may continue to initialize further systems within the SoC 102. Likewise, the primary bootloader 130 may initialize the storage memory 106 in order to access the secondary bootloader 131.

In block 320, the primary bootloader 130 loads the secondary bootloader 131. The secondary bootloader 131 may be stored on the storage memory 106, which may be a flash-based memory (e.g., electrically erasable programmable read-only memory ("EEPROM"), NAND, etc.). The storage memory 106 may operate relatively slower than the ROM 114. However, the storage memory 106 may be a form of readable and writeable memory; as such, the secondary bootloader 131 may be updated during the operational life of the SoC 102. Given that the secondary bootloader 131 may be updated, the secondary bootloader 131 may be configured to handle additional functionality. As described above, multiple secondary boot programs (not shown) may exist beyond the one depicted in FIG. 1. In one example, the secondary bootloader 131 may be authenticated (e.g., decrypted) by the primary bootloader 130.

In block 325, the secondary bootloader 131 loads the secure executable module 140, for example, from the storage memory 106. In one example, the secure executable module 140 may be encrypted and may require decryption by the authentication engine 169. Furthermore, in one example, the secure executable module 140 may be compressed and may require decompression by the SoC 102. The secure executable module 140 may contain functionality related to the application of the SoC 102. For example, the secure executable module 140 may contain algorithms to detect the presence of smoke and/or fire by using sensors electronically coupled to the SoC 102. Such an example would include the SoC 102 being embedded within a portable computing device configured as a smoke detector for a residential dwelling.

In block 330, the SoC 102 identifies memory segments for hibernation. That is, the SoC 102 identifies memory segments to be manipulated as part of transitioning from the normal mode to the hibernation mode. In one example, the secure executable module 200 may include several segments (e.g., hash metadata 225, text segment 230, data segment 235, BSS segment 240, etc.). One aspect of the secure executable module 200 is described above in FIG. 2A. In addition, a segment may also be a combination of other segments, e.g., text segment 230 and BSS segment 240, data segment 235 and BSS segment 240, etc. Such segments within the secure executable module 200 may be spread across the various memory banks within the RAM 245. Prior to entering the hibernation mode, the flow diagram 300 identifies segments of the secure executable module 200 that may be operable to being moved, compressed, encrypted, or combination thereof. In one example, the secure executable module 140 may be loaded from storage memory 106 and the segment attributes (e.g. ELF image segment attributes) may be checked to determine segment type (e.g., hash metadata 225, text segment 230, data segment 235, BSS segment 240, etc.) For example, the data segment 235 may reside in a memory bank within the RAM 245 and may be compressed and moved to another memory bank such that the previously utilized memory bank may be powered down to save energy during hibernation mode.

In one example, text segment 230 is not compressed or encrypted and is loaded into a memory bank without change. In another example, the BSS segment 240 does not need to be loaded into a memory bank and only the corresponding portion of a memory bank needs to be zero-initialized. In addition, header metadata (e.g. ELF header metadata) may be loaded into a memory bank. In one example, a memory mapping is performed such that text segment 230, data segment 235, and header metadata are loaded into a single memory bank. In one example, zero-initialized may refer to data (a.k.a., zero-initialized data or ZI data) which may be initialized in the source code (e.g., global variables, etc.) or initialized during image loading. In one example, a boot loader may zero out the memory portion pointed to as a ZI data segment based on the header metadata.

In one example, the flow diagram 300 may be configured to perform the operations from the secure executable module 200 itself. As one of skill in the art will understand, the secure executable module 200 may reside on the storage memory 259 and be operable to being updated by the developer, the user, etc. As such, the flow diagram 300 may utilize any number of factors to identify which segments provide desirable power savings by being moved, compressed, and/or encrypted within a different memory banks within the RAM 245.

In one aspect, the flow diagram 300 may identify the data segment 235, the BSS segment 240, and the application data 255 as being operable to being saved in the memory bank 247. For example, the flow diagram 300 may be making a determination based on the configuration 295 corresponding to normal mode operation. As stated, the configuration 295 may have substantially all the memory banks 247, 249, 251, 252 powered up and further operable to store data. In normal mode, the powering (or energizing) of such memory banks 247, 249, 251, 252 may consume more power than if the memory banks 249, 251, 252 were powered down. Further, the flow diagram 300 may determine that the data within the memory banks 249, 251, 252 may be compressed into the memory bank 247.

In one example, the flow diagram 300 may allocate a portion of memory corresponding to the saved memory segment 260. The saved memory segment 260 may be compressed and stored within the memory bank 247. Thus, in block 335, compress identified memory segments in the RAM. The block 335 is shown with dotted lines because, in some examples, the flow diagram 300 may not need to compress the data stored in the memory banks 249, 251, 252, all of which are to be powered down once the data is moved, because the data resident in the memory banks 249, 251, 252 may simply fit within the memory bank 247 without the need for compression.

In block 340, encrypt identified memory segments in the RAM, wherein the identified memory segments are the saved memory segment 260. One of skill in the art will understand that the block 340 is depicted in dotted lines to indicate that it may be optional. One advantage of encrypting the saved memory segment 260 is to prevent unauthorized access by a malicious hacker. As more and more traditional, volatile memory modules are replaced by non-volatile memory modules, the need to encrypt data may increase since the data may be stored and accessed even when the device is powered down.

In block 345, store the identified memory segments, wherein the identified memory segments are the saved memory segment 260. One of skill in the art will understand that the operations in the blocks 330, 335, 340 and 345 may be executed in slightly different orders depending on how one of skill in the art compresses and/or encrypts the saved memory segment 260. For example, many of the operations may be performed in place within the RAM 245, the storage memory 259, or combination thereof. In one example, the user may opt to not compress or encrypt the saved memory segment 260.

In block 350, the SoC 102 executes the normal mode boot. Given the preceding operations in the flow diagram 300, the SoC 102 is substantially initialized and prepared to operate for its intended application. If the SoC 102 is connected to a display (not shown), then the user may receive indications that the portable computing device is powered-up and entering normal mode. In another example, the SoC 102 may be connected to an audio speaker (not shown) which may alert the user that the portable computing device is nearing the end of its booting sequence.

In block 355, the portable computing device operates in the normal mode. In one example, the secure executable module 140 may contain functionality relating to the application of the SoC 102. Normal mode operations may include, for example, monitoring sensors and collecting data. Such data may be transmitted at intervals (random or predetermined) to a remote server in which such data may be utilized by further electronic systems. For example, the remote server may be operated by a utility company that charges customers for the consumption of electricity or natural gas. The exemplary utility company may then create accounts within the remote server and then charge customers according to the data reported by the SoC 102 (and its associated portable computing device).

In one example, the flow diagram 300 may spend a relatively longer period of time at block 355, since one intended purpose of the SoC 102 may be to provide a service to users (e.g., smoke detection, utility consumption monitoring, etc.). However, operation in normal mode may be more power consuming. Thus, lower power modes may be necessary to achieve a longer battery life if the portable computing device is powered by a fixed battery. Furthermore, the expectations by the industry demand that the battery life may need to be in excess of ten years. In addition, electricity is never free, from either a cost or environmental perspective; as such, reducing power consumption provides a benefit to society at large.

In block 360, determine whether to switch to hibernation mode. If the portable computing device is to switch to hibernation mode, the flow diagram 300 proceeds along the YES branch to the reference block A, which continues in FIG. 4. Returning to the decision block 360, if the portable computing device is to remain in the normal mode, the flow diagram 300 proceeds along the NO branch to the decision block 365. In block 365, determine whether to go to cold boot or not. If yes, go to cold boot. If no, proceed to block 370.

In block 370, determine whether to shut down the portable computing device. For example, the portable computing device (and its associated SoC 102) may need to power down completely for service by the user or a technician. In one example, the power management controller 108 may determine what subsystems need to be powered down. If the determination is to not shut down, proceed back to the block 355 where the SoC 102 may continue to operate in normal mode. Returning to the decision block 370, if the determination is to shut down the SoC 102 (and its associated portable computing device), proceed to the block 375.

In block 375, shut down the portable computing device and/or SoC 102. In one example, substantially all subsystems within the SoC 102 may be powered down, thus no longer consuming power. If the portable computing device is damaged, the portable computing device may no longer be operable to provide its intended functionality for the user. Therefore, the portable computing device may need service and/or replacement. As such, the portable computing device may need to be powered down for the safety of users or technicians handling the portable computing device.

In one example, prior to shut down, certain functionalities within the secure executable module 140 may need to be invoked. For example, the secure executable module 140 may need to be configured to transmit any non-transmitted data to a remote server prior to the shutdown of the portable computing device. If certain functionalities need to be invoked, they are invoked prior to the shut down in block 370.

In one example, a choice to implement a hibernation mode, as described above in FIG. 3, versus a cold boot mode may depend on relative current consumption for different states as well as relative time durations for different states. For example, let T=time duration between wakeup intervals (sec), Ihib=hibernate state current (mA), Thib=hibernate boot time (sec), Ihboot=hibernate boot current (mA), Tcold=cold boot time (sec), Icoldboot=cold boot current (mA), then a comparison equation may be evaluated as follows:

$$T * Ihib + Thib * Ihboot \sim Tcold * Icoldboot$$

where ~ means to compare the two sides of the equation. For example, if Ihib=0.4 mA, Thib=1.65 sec, Ihboot=52.6 mA, Tcold=3.3 sec, Icoldboot=70.4 mA, the comparison equation becomes $$T * 0.4 \text{ mA} + 1.65 \text{ sec} * 52.6 \text{ mA} \sim 3.3 \text{ sec} * 70.4 \text{ mA}$$

$$T * 0.4 \text{ mA} \sim 145.5 \text{ mA sec}$$

Then, the left hand side is lower (i.e., select hibernation mode) if T<363 sec and the right hand side is higher (i.e., select cold boot mode) if T>363 sec.

Figure 4:
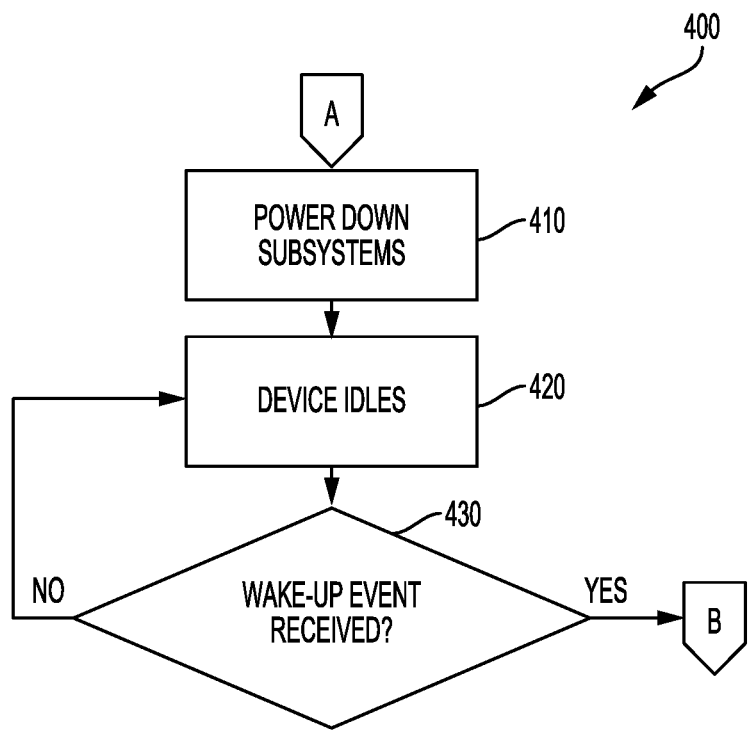
FIG. 4 illustrates an example flow diagram for entering a hibernation mode within a portable computing device.

FIG. 4 illustrates an example flow diagram 400 for entering a hibernation mode within a portable computing device. The flow diagram 400 begins at reference block A, which was initiated by the flow diagram 300 in FIG. 3. One of skill in the art will understand that the processes 300, 400 may be the same process when implemented within the SoC 102. Further, one of skill in the art will appreciate that the processes 300, 400 may be comprised of multiple sub-processes. The particular implementation of such processes 300, 400 may vary slightly from this description but will be substantially consistent with the intended use and function described herein.

Once the saved memory segment 260 is stored, the process 400 proceeds to the block 410 where the SoC 102 powers down subsystems within the portable computing device. As shown by the configuration 297, the memory banks 249, 251, 252 may be powered down to save battery life and/or reduce overall power consumption (even if connected to a constant power source). Likewise, the SoC 102 may power down additional subsystems including: the storage controller 122, the storage memory 106, the ROM 114, the CPU 110, the authentication engine 169, etc. Memory bank 247 may be maintained in a powered up state with its contents saved during hibernation mode. In one example, memory bank 247 is maintained in a self-refresh mode (e.g. DDR self-refresh mode). In one aspect, the configuration 299 may be established by the process 400. One of skill in the art will appreciate that the power management controller 108 may contain some of the logic necessary to achieve the functionality related to the operations in the block 440 by the process 400.

Following block 360 of FIG. 3, if it is determined to switch to hibernation mode, then in block 410, power down the subsystems. In block 420, the portable computing device idles. Given the nature of IoT-focused portable computing devices, a vast majority of the portable computing device's lifetime may be spent in such an idle state thus effectively placing the portable computing device in a hibernation mode. In hibernation mode, the portable computing device may not need to make observations via sensors or transmit data to a remote server. Thus, having subsystems powered down may significantly save energy, which, in turn, extends the battery life of the portable computing device. Even if the portable computing device is connected to a constant power source, saving electricity is both advantageous from both cost and conservation of natural resources.

In block 430, determine if a wake-up event is received. In one example, the wake-up event may be at a non-deterministic interval of time. For example, the SoC 102 may be embedded in a weather observation station, which is configured to repeatedly read sensors relating to weather (e.g., the humidity, the temperature, the wind speed, the wind direction, etc.).

In another example, the wake-up event may be based on a sensor (not shown) which wakes the SoC 102. For example, the SoC 102 may be embedded within a glucose monitor that periodically reads the blood glucose of a patient. Such a blood glucose sensor may be constantly powered up to ensure the health of the connected patient. However, a substantial number of subsystems within the SoC 102 may still be powered down. Once the powered-up sensor receives data corresponding to a particular scenario, the sensor may generate the wake-up event. If it is determined that no wake-up event is received, proceed back to block 420 where the portable computing device continues to idle. If in block 430 it is determined that a wake-up event is received, then proceed to the reference block B, which continues in FIG. 5.

Figure 5:
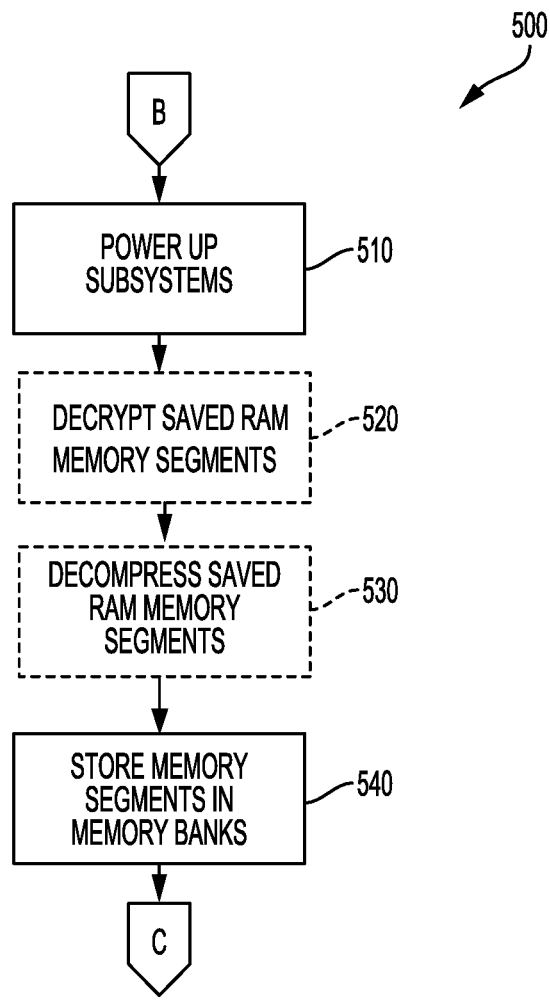
FIG. 5 illustrates an example flow diagram for exiting a hibernation mode within a portable computing device.

FIG. 5 illustrates an example flow diagram 500 for exiting a hibernation mode within a portable computing device. The flow diagram 500 begins at the reference block B, which originated in FIG. 4. One of skill in the art will understand that the flow diagrams 300, 400, 500 may be unitary, in one aspect. Further, one of skill in the art will understand that the flow diagrams 300, 400, 500 may include multiple sub-processes, each of which support the flow diagrams 300, 400, 500.

In block 510, power up the subsystems within the SoC 102 (and, potentially, any other electronically connected components, like a sensor, a display, etc.). In one example, the wake-up event may cause the portable computing device to begin waking from the hibernation mode. As part of such waking up, subsystems being powered up in the SoC 102 may include one or more of the following: the CPU 110, the SRAM 112, the ROM 114, the authentication engine 169, the power management interface 118, the power management controller 108, the bus 116, the bus 124, the bus 125, the bus 128, etc.

In block 520, decrypt the saved memory segment 260 from the RAM 245. The block 520 is shown in dotted lines because the operations therein may be optional if the saved memory segments are not encrypted. Once the saved memory segment 260 is decrypted (or determined to not be encrypted), proceed to block 530.

In block 530, decompresses the saved memory segment 260. As previously described, the saved memory segment 260 may not need to be compressed. An example where the saved memory segment 260 need not be compressed could be that the saved memory segment 260 fits within a single memory bank (e.g., the memory bank 247) without the need for compression. In other examples, the saved memory segment 260 may require compression to fit within the memory bank 247 or it may prove difficult, or maybe even impossible, to store the saved memory segment 260 within the memory bank 247.

While reference has been made to a single memory bank containing the saved memory segment 260 (e.g., the memory bank 247), one of skill in the art will understand that the saved memory segment 260 may be stored across more than one memory bank. For example, the saved memory segment 260 may need to be stored across the memory banks 247, 249 in order to adequately represent the compressed and/or encrypted portions stored in powered-down memory banks (in this example, memory banks 251, 252). Thus, hybrid combinations of the configurations 295, 297, 299 may be achieved without departing from the spirit and scope of the present disclosure. The block 530 is shown in dotted lines because the operations therein may be optional if the saved memory segments are not compressed.

In block 540, store the decompressed and/or decrypted data associated with the saved memory segment 260 in the RAM 245. In one example, the memory banks 249, 251, 252 may need to be powered up to store the decompressed and/or decrypted data may be stored therein. In one example, the storing in block 540 may achieve the configuration 295 (or one substantially similar). Depending on the needs of the portable computing device, the memory banks 249, 251, 252 may be powered up in block 540 unless they have previously been powered up, for example in block 510. In addition, the decompressed and/or decrypted data may be stored to a desired memory location based on the header metadata. Also, in one example, the BSS segment 240 may be zero-initialized based on the header metadata. In one example, the exiting hibernation mode may not require reading anything from storage memory 106. Consequently, one advantage of the steps presented in the flow diagrams 300, 400, 500 is that the exiting of hibernation mode is very fast. Also, there is substantial dc power savings as the power management controller 108 and its RAM powering switch and low dropout regulator (LDO) remain on while other components are off in hibernation mode. Following block 540, proceed to the reference block C, which appears in FIG. 3.

Returning to the reference block C in FIG. 3, proceed to block 355 where the portable computing device operates in normal mode. One of skill in the art may combine the steps presented in the flow diagrams 300, 400, 500 according to the implementation needs and constraints.

Figure 6:
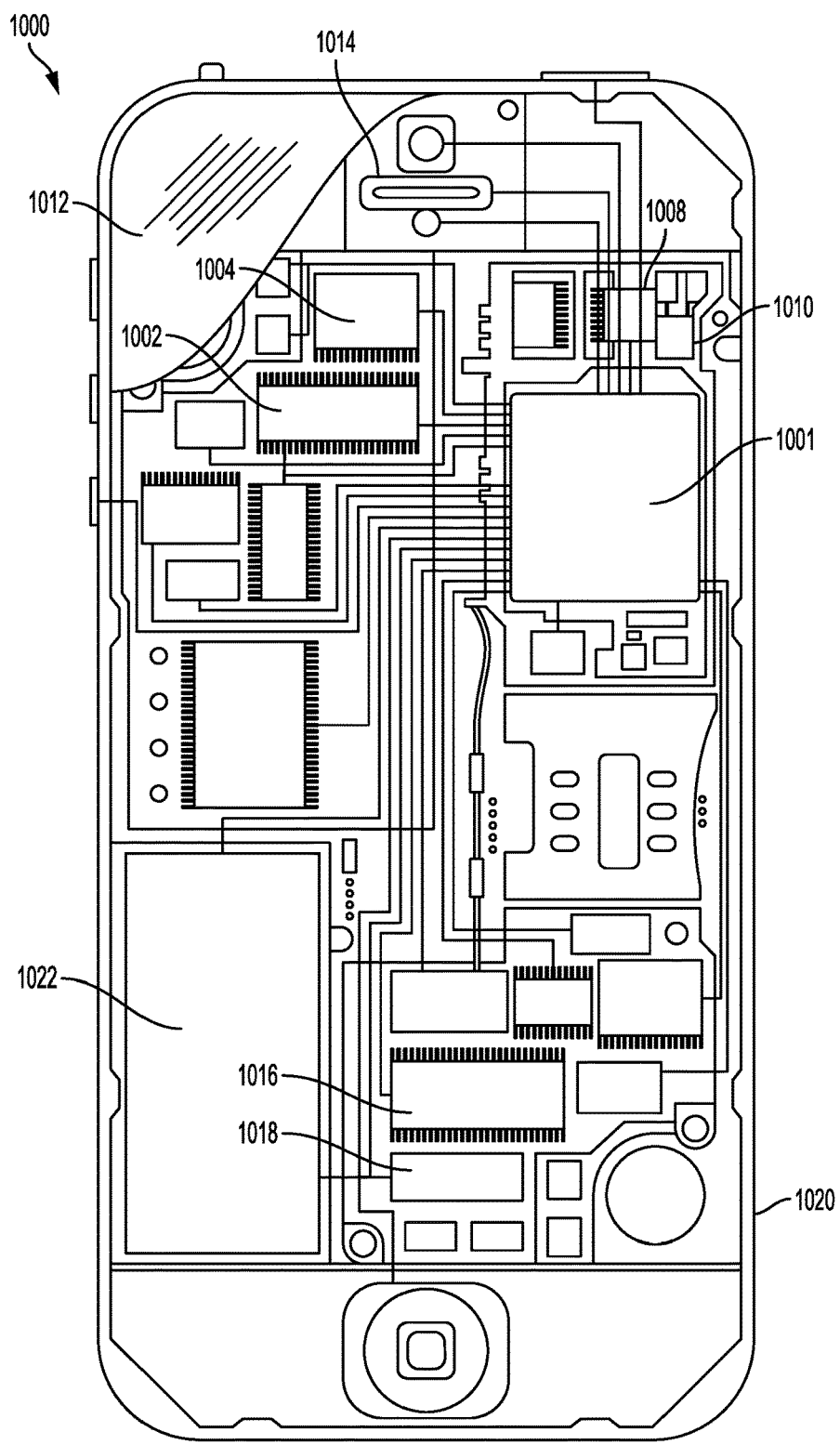
FIG. 6 illustrates an example block diagram of a portable computing device for incorporating the system and method described herein.

FIG. 6 illustrates an example block diagram of a portable computing device 1000 for incorporating the system and method described herein. The various aspects (including, but not limited to, aspects discussed above with reference to FIGS. 1 through 5) may be implemented in any of a variety of the computing devices including a portable computing device 1000, an example of which is illustrated in FIG. 6. As such, the portable computing device 1000 may implement the steps of the flow diagrams 300, 400, 500 in FIGS. 3, 4, and 5, respectively. One of skill in the art will understand that the portable computing device 1000 may include several components that may not be necessary in an IoT application. Determining which, if any, components may be removed to further reduce power consumption and extend battery life will be known to one skilled in the art based on a particular application and/or usage.

Furthermore, the IoT field is nascent and future designs may include ones that are not exactly the same as the portable computing device 1000 but are substantially similar in spirit and scope. One trend emerging in the IoT space is the need for many sensors electronically coupled to the portable computing device 1000. Such sensors may detect the temperature, the humidity, the wind speed, the ambient sunlight, the presence of smoke/fire, the movement of physical objects, etc.

In one example, the portable computing device 1000 may include a processor 1001 coupled to a touch screen controller 1004 and an internal memory 1002. The processor 1001 may be one or more multicore integrated circuits (ICs) designated for general or specific processing tasks. In one example, the processor 1001 may be substantially the same as SoC 102 described herein. The internal memory 1002 may be volatile or non-volatile memory, and may also be secure and/or encrypted memory, or unsecure and/or decrypted memory, or any combination thereof. The touch screen controller 1004 and the processor 1001 may also be coupled to a touch screen panel 1012, such as a resistive-sensing touch screen, capacitive-sensing touch screen, infrared sensing touch screen, etc.

The portable computing device 1000 may have one or more radio signal transceivers 1008 (e.g., Peanut®, Bluetooth®, Zigbee®, Wi-Fi, RF, cellular, etc.) and antennae 1010, for sending and receiving, coupled to each other and/or to the processor 1001. The transceivers 1008 and antennas 1010 may be used with the above-mentioned circuitry to implement various wireless transmission protocol stacks and interfaces and to establish the various wireless links discussed herein. The portable computing device 1000 may include one or more cellular network wireless modem chips 1016, such as one cellular network wireless modem chip, two cellular network wireless modem chips, three cellular network wireless modem chips, four cellular network wireless modem chips, or more than four cellular network wireless modem chips, that enables communication via one or more cellular networks and that are coupled to the processor 1001. The one or more cellular network wireless modem chips 1016 may enable the portable computing device 1000 to receive services from one or more cellular networks (e.g., CDMA, TDMA, GSM, 3G, 4G, 5G, LTE, or any other type of cellular network), to implement various wireless transmission protocol stacks and interfaces, and to establish the various wireless links discussed herein.

The portable computing device 1000 may include a peripheral device connection interface 1018 coupled to the processor 1001. The peripheral device connection interface 1018 may be singularly configured to accept one type of connection, or multiply configured to accept various types of physical and communication connections, common or proprietary, such as USB, FireWire, Thunderbolt, Ethernet, or PCIe. The peripheral device connection interface 1018 may also be coupled to a similarly configured peripheral device connection port (not shown). The portable computing device 1000 may also include speakers 1014 for providing audio outputs.

The portable computing device 1000 may also include a housing 1020, constructed of a plastic, metal, or a combination of materials, for containing all or some of the components discussed herein. The portable computing device 1000 may include a power source 1022 coupled to the processor 1001, such as a disposable or rechargeable battery. The rechargeable battery may also be coupled to the peripheral device connection port to receive a charging current from a source external to the portable computing device 1000.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described (e.g., in FIGS. 3, 4, 5) may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

In one aspect, one or more of the steps for changing power modes in a portable computing device in FIGS. 3, 4, 5 may be executed by one or more processors which may include hardware, software, firmware, etc. In one aspect, one or more of the steps for in FIGS. 3, 4, 5 may be executed by one or more processors which may include hardware, software, firmware, etc. The one or more processors, for example, may be used to execute software or firmware needed to perform the steps in the flow diagram of FIGS. 3, 4, 5. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium.

The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer.

The computer-readable medium may reside in the processing system, external to the processing system, or distributed across multiple entities including the processing system. The computer-readable medium may be embodied in a computer program product. By way of example, a computer program product may include a computer-readable medium in packaging materials. The computer-readable medium may include software or firmware for changing power modes in a portable computing device. Those skilled in the art will recognize how best to implement the described functionality presented throughout this disclosure depending on the particular application and the overall design constraints imposed on the overall system.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and Blu-ray disc where disks usually reproduce data magnetically, while discs reproduce data optically with lasers. Combinations of the above should also be included within the scope of computer-readable media.

Alternative aspects will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for power mode selection in a portable computing device, the method comprising:
   operating the portable computing device in a normal mode, the normal mode utilizing a plurality of memory banks within a volatile memory, the plurality of memory banks being powered-up and operable to store data;
   identifying at least one or more memory segments within the plurality of memory banks;
   storing a first of the at least one or more memory segments as a stored memory segment in the volatile memory, the stored memory segment operable to restore at least a portion of the at least one or more memory segments; and
   powering down a portion of the plurality of memory banks associated with the at least one or more memory segments to transition the portable computing device to a hibernation mode, a cold boot mode or a shut down mode; wherein a choice between the hibernation mode or the cold boot mode is based on a first product of current consumption and time duration of the hibernation mode and a second product of current consumption and time duration of the cold boot mode.

2. The method of claim 1, wherein the volatile memory is a random access memory (RAM).

3. The method of claim 2, further comprising storing a second of the at least one or more memory segments within a storage memory, the storage memory being non-volatile.

4. The method of claim 2, further comprising:
   compressing the stored memory segment; and
   encrypting the stored memory segment.

5. The method of claim 2, further comprising determining whether to switch to a hibernation mode or to a cold boot mode.

6. The method of claim 5, wherein the determining whether to switch to a hibernation mode or a cold boot mode is further based on one or more of the following factors: time duration between wakeup intervals, hibernate state current, hibernate boot time, hibernate boot current, cold boot time, and cold boot current.

7. The method of claim 6, further comprising:
   compressing the stored memory segment; and
   encrypting the stored memory segment.

8. The method of claim 7, further comprising:
   powering down additional subsystems not associated with the stored memory segment within the portable computing device.

9. The method of claim 6, further comprising receiving a wake up event.

10. The method of claim 9, further comprising:
powering up the portion of the plurality of memory banks associated with the at least one or more memory segments;
restoring the first of the at least one or more memory segments based on the stored memory segment; and
storing the first of the at least one or more memory segments in the powered-up portion of the plurality of memory banks.

11. The method of claim 10, wherein the restoring the first of the at least one or more memory segments comprises:
decompressing the stored memory segment; and
decrypting the stored memory segment.

12. A system for power mode selection in a portable computing device, the system comprising:
means for operating the portable computing device in a normal mode, the normal mode utilizing a plurality of memory banks within a volatile memory, the plurality of memory banks being powered-up and operable to store data;
means for identifying at least one or more memory segments within the plurality of memory banks;
means for storing a first of the at least one or more memory segments as a stored memory segment in the volatile memory, the stored memory segment operable to restore at least a portion of the at least one or more memory segments; and
means for powering down a portion of the plurality of memory banks associated with the at least one or more memory segments to transition the portable computing device to a hibernation mode, a cold boot mode or a shutdown mode; wherein a choice between the hibernation mode or the cold boot mode is based on a first product of current consumption and time duration of the hibernation mode and a second product of current consumption and time duration of the cold boot mode.

13. The system of claim 12, wherein the volatile memory is a random access memory (RAM).

14. The system of claim 13, further comprising means for storing a second of the at least one or more memory segments within a storage memory, the storage memory being non-volatile.

15. The system of claim 13, further comprising:
means for compressing the stored memory segment; and
means for encrypting the stored memory segment.

16. The system of claim 15, further comprising means for determining whether to switch to a hibernation mode or a cold boot mode.

17. The system of claim 16, wherein one or more of the following factors is used by the means for determining whether to switch to a hibernation mode or a cold boot mode: time duration between wakeup intervals, hibernate state current, hibernate boot time, hibernate boot current, cold boot time, and cold boot current.

18. The system of claim 17, further comprising:
means for powering down additional subsystems not associated with the stored memory segment within the portable computing device.

19. The system of claim 12, further comprising means for receiving a wake up event.

20. The system of claim 12, further comprising:
means for powering up the portion of the plurality of memory banks associated with the at least one or more memory segments;
means for restoring the first of the at least one or more memory segments based on the stored memory segment; and
means for storing the first of the at least one or more memory segments in the powered-up portion of the plurality of memory banks.

21. The system of claim 20, wherein the means for restoring the first of the at least one or more memory segments comprises:
means for decompressing the stored memory segment; and
means for decrypting the stored memory segment.

22. A portable computing device, comprising:
a system-on-chip ("SoC");
a random access memory ("RAM") coupled to the system-on-chip;
a processor coupled to the RAM, the processor configured to perform operations comprising:
operating the portable computing device in a normal mode, the normal mode utilizing a plurality of memory banks within the RAM, the plurality of memory banks being powered-up and operable to store data;
identifying at least one or more memory segments within the plurality of memory banks;
storing a first of the at least one or more memory segments as a stored memory segment in the RAM, the stored memory segment operable to restore at least a portion of the at least one or more memory segments; and
powering down a portion of the plurality of memory banks associated with the at least one or more memory segments to transition the portable computing device to a hibernation mode, a cold boot mode or a shutdown mode; wherein a choice between the hibernation mode or the cold boot mode is based on a first product of current consumption and time duration of the hibernation mode and a second product of current consumption and time duration of the cold boot mode.

23. The portable computing device of claim 22, wherein the processor is further configured to perform operations comprising:
compressing the stored memory segment; and
encrypting the stored memory segment.

24. The portable computing device of claim 22, wherein the processor is further configured to perform operations comprising determining whether to switch to a hibernation mode or a cold boot mode.

25. The portable computing device of claim 24, wherein the processor determines whether to switch to a hibernation mode or a cold boot mode based on one or more of the following factors: time duration between wakeup intervals, hibernate state current, hibernate boot time, hibernate boot current, cold boot time, and cold boot current.

26. The portable computing device of claim 25 wherein the processor is further configured to perform operations comprising:
receiving a wake up event;
powering up the portion of the plurality of memory banks associated with the at least one or more memory segments;
restoring the first of the at least one or more memory segments based on the stored memory segment; and
storing the first of the at least one or more memory segments in the powered-up portion of the plurality of memory banks.

27. The portable computing device of claim 22, wherein the portable computing device is an Internet-of-things ("IoT") device, which comprises any one of: a utility meter, a smoke detector, a thermostat, a weather station, a security system, a refrigerator, a washing machine, a clothes dryer, a television, a gaming console, a gaming console peripheral, a personal assistant, an entertainment system, or combination thereof.

28. A non-transitory processor-readable storage medium having stored thereon processor-executable instructions configured to cause a processor to perform operations for power mode selection in a portable computing device, the operations comprising:

operating the portable computing device in a normal mode, the normal mode utilizing a plurality of memory banks within a volatile memory, the plurality of memory banks being powered-up and operable to store data;

identifying at least one or more memory segments within the plurality of memory banks;

storing a first of the at least one or more memory segments as a stored memory segment in the volatile memory, the stored memory segment operable to restore at least a portion of the at least one or more memory segments; and powering down a portion of the plurality of memory banks associated with the at least one or more memory segments to transition the portable computing device to a hibernation mode, a cold boot mode or a shutdown mode; wherein a choice between the hibernation mode or the cold boot mode is based on a first product of current consumption and time duration of the hibernation mode and a second product of current consumption and time duration of the cold boot mode.

29. The non-transitory processor-readable storage medium having stored thereon processor-executable instructions configured to cause a processor to perform operations relating to power mode selection in the portable computing device of claim 28, the operations further comprising:

compressing the stored memory segment; and encrypting the stored memory segment.

30. The non-transitory processor-readable storage medium having stored thereon processor-executable instructions configured to cause a processor to perform operations relating to power mode selection in the portable computing device of claim 29, the operations further comprising:

receiving a wake up event;

powering up the portion of the plurality of memory banks associated with the at least one or more memory segments;

restoring the first of the at least one or more memory segments based on the stored memory segment, wherein the restoring the first of the at least one or more memory segments comprises decompressing the stored memory segment and decrypting the stored memory segment; and storing the first of the at least one or more memory segments in the powered-up portion of the plurality of memory banks.

\* \* \* \* \*